United States Patent
Choi

(10) Patent No.: US 10,166,943 B2
(45) Date of Patent: Jan. 1, 2019

(54) AIRBAG APPARATUS FOR VEHICLE

(71) Applicant: Hyundai Motor Company, Seoul (KR)

(72) Inventor: Jun Yeol Choi, Whasung-Si (KR)

(73) Assignee: Hyundai Motor Company, Seoul (KR)

( * ) Notice: Subject to any disclaimer, the term of this patent is extended or adjusted under 35 U.S.C. 154(b) by 57 days.

(21) Appl. No.: 15/341,194

(22) Filed: Nov. 2, 2016

(65) Prior Publication Data
US 2017/0355340 A1    Dec. 14, 2017

(30) Foreign Application Priority Data

Jun. 8, 2016   (KR) .................. 10-2016-0070672

(51) Int. Cl.
| | |
|---|---|
| *B60R 21/2346* | (2011.01) |
| *B60R 21/261* | (2011.01) |
| *B60R 21/217* | (2011.01) |
| *B60R 21/16* | (2006.01) |
| *B60R 21/231* | (2011.01) |
| *B60R 21/26* | (2011.01) |

(52) U.S. Cl.
CPC ............ *B60R 21/16* (2013.01); *B60R 21/217* (2013.01); *B60R 21/2176* (2013.01); *B60R 21/2346* (2013.01); *B60R 21/261* (2013.01); *B60R 2021/23123* (2013.01); *B60R 2021/2612* (2013.01); *B60R 2021/26082* (2013.01)

(58) Field of Classification Search
CPC ... B60R 21/2346; B60R 21/26; B60R 21/261; B60R 21/2612; B60R 21/2176; B60R 21/217; B60R 21/16; B60R 21/233; B60R 2021/26082; B60R 2021/23324; B60R 2021/161; B60R 2021/23123; B60R 2021/2612

USPC .......... 280/740, 736, 742, 743.1, 729, 728.2
See application file for complete search history.

(56) References Cited

U.S. PATENT DOCUMENTS

| | | | |
|---|---|---|---|
| 6,070,904 A | 6/2000 | Ozaki et al. | |
| 2011/0018244 A1* | 1/2011 | Schindzielorz | B60R 21/231 280/743.1 |
| 2016/0039381 A1 | 2/2016 | Hatfield et al. | |

FOREIGN PATENT DOCUMENTS

| | | | |
|---|---|---|---|
| JP | 2000-118337 A | | 4/2000 |
| JP | 3878220 B2 | | 2/2007 |
| JP | 2009-227061 A | | 10/2009 |
| JP | 2009227061 A | * | 10/2009 |
| KR | 10-2011-0024930 A | | 3/2011 |
| KR | 10-2013-0045057 A | | 5/2013 |
| KR | 10-2016-0016204 A | | 2/2016 |

OTHER PUBLICATIONS

Definition of "fabric"; The Free Dictionary; https://www.thefreedictionary.com/fabric; May 16, 2018.*

* cited by examiner

*Primary Examiner* — Keith J Frisby
(74) *Attorney, Agent, or Firm* — Morgan, Lewis & Bockius LLP

(57) ABSTRACT

An airbag apparatus for a vehicle my include an airbag housing accommodating an airbag cushion, an inflator supplying gas into the airbag cushion, a hard retainer fixing the inflator to the airbag housing, and a soft retainer having a first side coupled to the hard retainer and controlling a flow of the gas supplied from the inflator.

7 Claims, 4 Drawing Sheets

AIRBAG APPARATUS FOR VEHICLE

CROSS REFERENCE TO RELATED APPLICATION

The present application claims priority to Korean Patent Application No. 10-2016-0070672, filed Jun. 8, 2016, the entire contents of which is incorporated herein for all purposes by this reference.

BACKGROUND OF THE INVENTION

Field of the Invention

The present invention relates to a structure for controlling the flow of gas supplied through an inflator in an airbag apparatus for a vehicle, particularly, to retainers that are made of different materials.

Description of Related Art

As interest in the safety of passengers in vehicles has increased along with the functionality and convenience of vehicles, the importance of safety-related devices, which can protect passengers in the event of an accident, has increased. Among such safety devices for passengers, an airbag system in particular is basic equipment that distributes shocks applied to a passenger in the event of a collision.

Among such safety devices, a front airbag is a basic one, which is installed in front of a passenger, prevents the passenger from directly hitting various structures in a vehicle, and blocks the energy of a shock transmitted from outside in the event of a collision.

However, in the airbags of the related art, a retainer is permanently deformed by the explosive pressure of an inflator in the process of supplying gas, so a desired flow of gas is not achieved, and accordingly, the airbags do not inflate in desired ways.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an airbag apparatus for a vehicle that can prevent the permanent deformation of retainers due to the inflation pressure of an airbag by using a hard material and a soft material for the retainers.

According to various aspects of the present invention, an airbag apparatus for a vehicle may include an airbag housing accommodating an airbag cushion, an inflator supplying gas into the airbag cushion, a hard retainer fixing the inflator to the airbag housing, and a soft retainer having a first side coupled to the hard retainer and controlling a flow of the gas supplied from the inflator.

The hard retainer may be formed in a plate shape including a protrusion along an outer edge thereof.

The soft retainer may be made of a fiber material.

The soft retainer may be a mesh formed from a wire-shaped shape memory alloy.

The apparatus may further include fixing members fixing edges of a second side of the soft retainer and crossing each other.

The fixing members may be longer than a bottom of the hard retainer and shorter than a bottom of the airbag housing.

The apparatus may further include a fixing band disposed along an edge of a second side of the soft retainer.

The fixing band may be made of a shape memory alloy.

A viscous substance may be applied to a side of the soft retainer that comes in contact with the gas from the inflator.

According to the airbag apparatus for a vehicle of various embodiments of the present invention, there are provided a hard retainer and a soft retainer, and the retainers are not permanently deformed even by the explosive pressure of an airbag, so it is possible to achieve desired gas flow. Further, dirt and flame discharged together when the inflator explodes are collected by the viscous substance applied to the inner side of the soft retainer, so it is possible to prevent damage to the airbag cushion.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
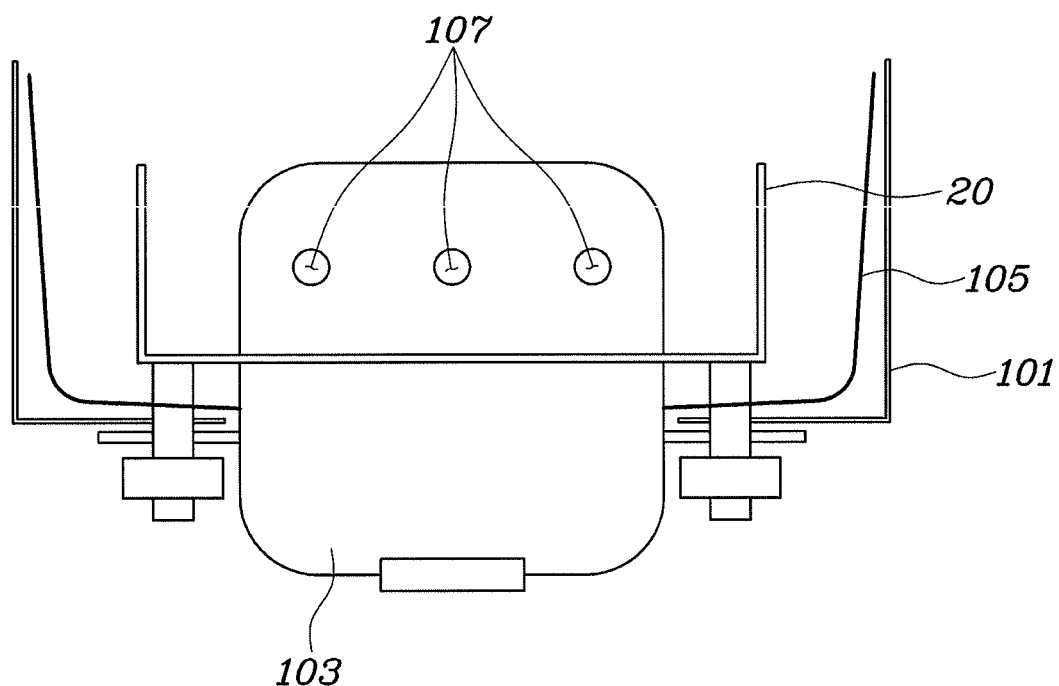
FIG. 1 is a conceptual diagram of an airbag apparatus for a vehicle of the related art.
Figure 2:
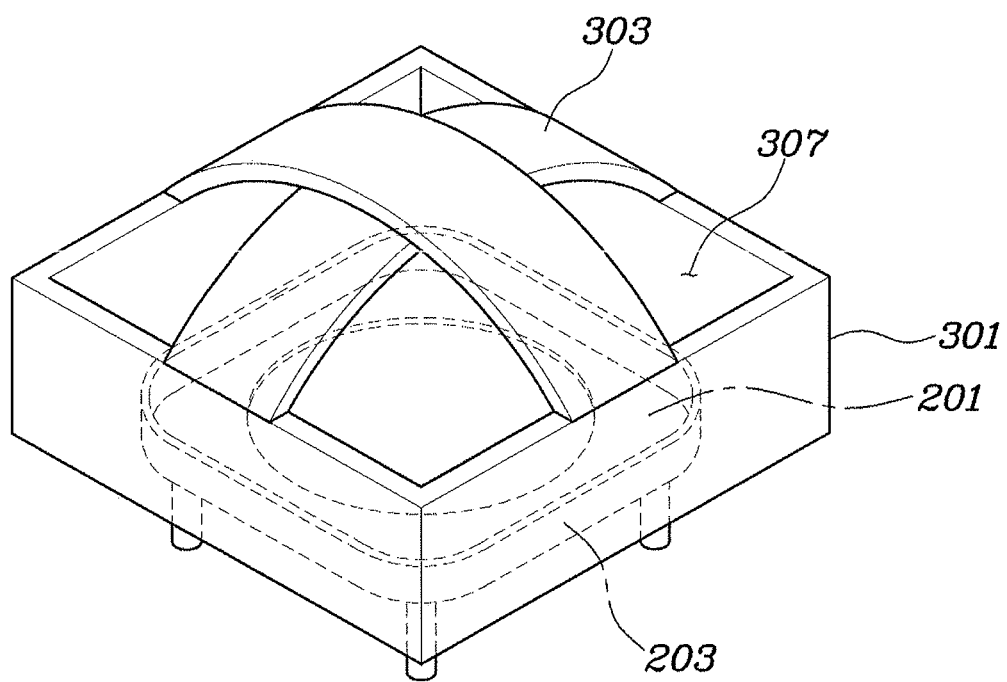
FIG. 2 is a view showing a hard retainer and a soft retainer according to various embodiments of the present invention.
Figure 3:
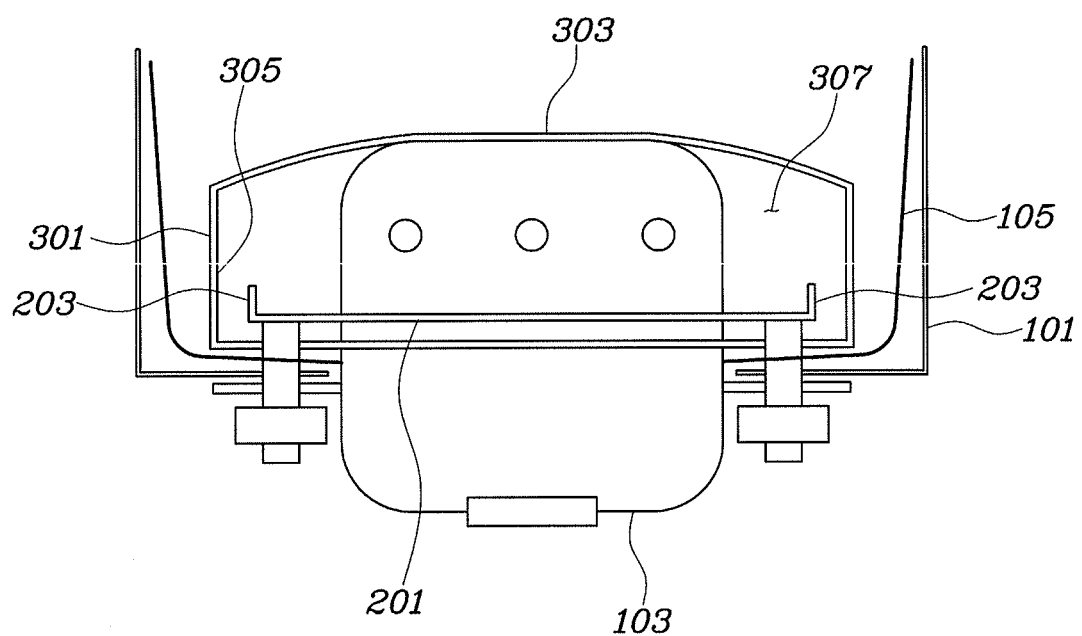
FIG. 3 is a conceptual view showing a cross-section of an airbag apparatus for a vehicle according to various embodiments of the present invention.

FIG. 1 is a conceptual diagram of an airbag apparatus for a vehicle of the related art, FIG. 2 is a view showing a hard retainer and a soft retainer 301 according to various embodiments of the present invention, and FIG. 3 is a view showing a hard retainer and a soft retainer according to various embodiments of the present invention.

An airbag apparatus for a vehicle according to various embodiments of the present invention includes an airbag housing 101 accommodating an airbag cushion 105, an inflator 103 supplying gas into the airbag cushion 105, a hard retainer fixing the inflator 103 to the airbag housing 101, and a soft retainer 301 having a first side coupled to the hard retainer and controlling the flow of gas supplied from the inflator 103.

A common airbag apparatus has the configuration shown in FIG. 1. In detail, the airbag apparatus is formed of an airbag cushion 105 that comes into direct contact with a passenger, an airbag housing 101 that accommodates the airbag cushion 105, and an inflator 103 that is disposed in the airbag housing 101 and supplies gas into the airbag cushion 105. The airbag apparatus further includes a retainer 20 that fixes the inflator 103 to the airbag housing 101 and controls flow of the gas supplied from the inflator 103.

In the airbag apparatus of the related art, the retainer 20 is made of a single hard material and, as described above, fixes the inflator 103 to the airbag housing 101 and controls the flow of the gas supplied from the inflator 103. The retainer 20 is generally made of metal and, in some cases, the retainer 20 is opened and permanently deformed by the pressure of the gas discharged through a gas hole 107 in the early stage of explosion of the inflator 103 when the airbag inflates, so the desired flow of gas cannot be achieved.

Figure 4:
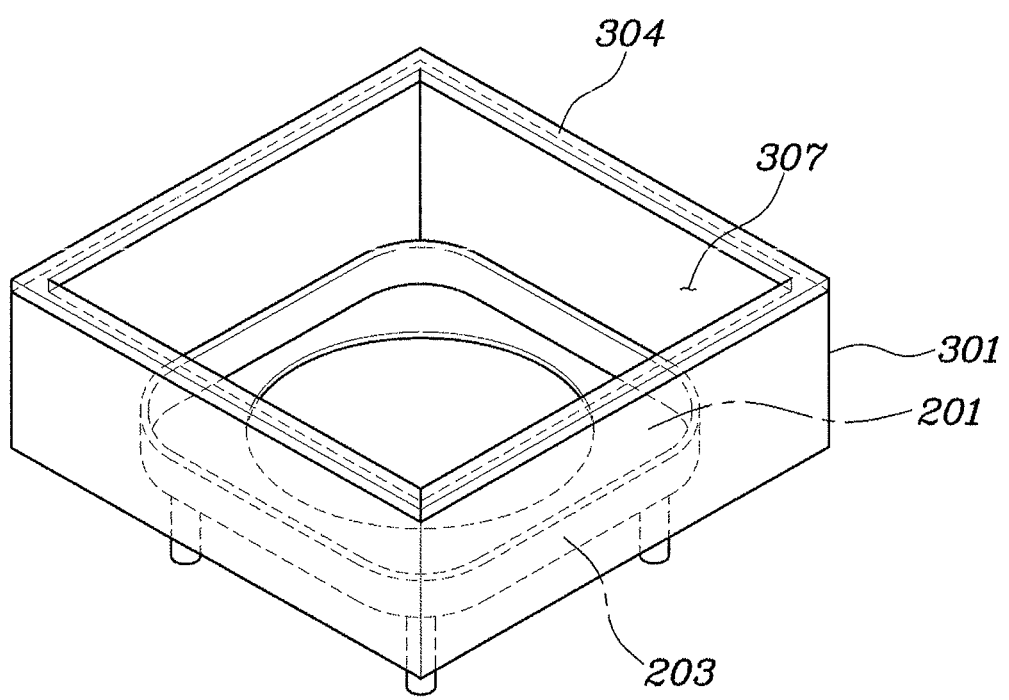
FIG. 4 is a view showing a hard retainer and a soft retainer according to various embodiments of the present invention.

Accordingly, in various embodiments of the present invention, as shown in FIGS. 2 to 4, a retainer is made of different materials, that is, is composed of a hard retainer 201 and a soft retainer 301 that is flexible. In detail, the hard retainer 201 has a function of fixing the inflator 103 to the housing and the soft retainer 301 has a function of controlling the flow of the gas supplied from the inflator 103.

The soft retainer 301 is deformed in the early stage of supplying high-pressure gas with explosion of the inflator 130, but is not permanently deformed, so it can restore its initial shape so that gas can be guided in the desired way.

The soft retainer 301 may be made of fiber. The soft retainer 301 must not only be flexible, it must also resist the pressure that is generated when the inflator 103 explodes, and moreover it must also resist high-temperature heat. Accordingly, when the soft retainer 301 is made of fiber, it can resist the explosive pressure of the inflator 103 owing to its high tensile strength, and the thermal resistant fiber makes it possible for the soft retainer to resist high-temperature heat.

However, the soft retainer 301 should perform the function of controlling the flow of gas, so when an open side 307 that is a second side freely flaps, it makes it difficult to guide gas and accordingly it would be disadvantageous.

Accordingly, various embodiments of the present invention further includes fixing members 303 connecting and fixing edges of the second side 307 of the soft retainer 301 and crossing each other.

In detail, the fixing members 303 may be longer than the bottom of the hard retainer 201 and shorter than the bottom of the airbag housing 101, so the diameter of the open side 307 that can be increased is limited by the fixing members 303 crossing each other over the open side of the soft retainer 301, whereby the flow of gas can be controlled.

Further, unlike existing retainers made of a single piece of metal, the retainer of various embodiments of the present invention is formed of two parts, that is, the hard retainer 201 and the soft retainer 301, so the weight and manufacturing cost of the airbag apparatus are reduced. Further, since the soft retainer 301 can freely change in shape, it is convenient to pack the airbag apparatus.

The soft retainer 301 may be formed in a mesh type of a wire-shaped shape memory alloy.

A shape memory alloy is metal that returns to a shape memorized in advance at a predetermined temperature. Accordingly, when the soft retainer 301 is formed in a mesh type made of wires of a shape memory alloy, it can be restored into its initial shape by the heat of the explosion even if it is deformed by the explosive pressure of the inflator 103, so it is possible to guide gas flow.

The airbag apparatus may further include a fixing band 304 disposed along the edge of the second side of the soft retainer 301. The fixing band 304 may be made of a shape memory alloy.

As described above, since the soft retainer 301 is also supposed to control the flow of gas, it is required to control the shape of the open side 307. In various embodiments of the present invention, as shown in FIG. 3, the shape of the open side 307 is controlled by disposing the fixing band 304 made of a shape memory alloy along the edge of the second side of the soft retainer 301. Even if the soft retainer 301 is deformed by the explosive pressure of the inflator 103 when the airbag inflates, it is restored to a predetermined shape by the heat, so it can guide gas flow.

The hard retainer 201 may be formed in the shape of a plate having a protrusion 203 formed along the outer edge.

The hard retainer 201 is disposed close to the inflator 103 and is intended to fix the inflator 103, which generates a large explosion, to the airbag housing 101, so it can resist deformation due to the explosion.

Accordingly, the protrusion 203 is formed along the outer edge of the plate-shaped retainer to be able to resist buckling.

A viscous substance may be applied to the side of the soft retainer 301 with which the gas from the inflator 103 comes in contact.

The inflator 103 supplies gas, which is produced by exploding powder therein, into the airbag cushion 105 such that the gas expands in the airbag cushion 105. In this process, not only the gas, but flame of the powder that is burned with dirt produced in the explosive process are supplied. The dirt or flame may tear or melt the airbag cushion 105 in the airbag cushion 105, so it is required to prevent them from being supplied into the airbag cushion 105.

Accordingly, in various embodiments of the present invention, the viscous substance 305 is applied to the inner side of the soft retainer 301, that is, the side to which gas is supplied from the inflator 103 to collect the dirt or flame, whereby it is possible to prevent damage to the airbag cushion 105.

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An airbag apparatus for a vehicle, comprising:
an airbag housing accommodating an airbag cushion;
an inflator supplying gas into the airbag cushion;
a first retainer fixing the inflator to the airbag housing; and
a second retainer having a first side coupled to the first retainer and controlling a flow of the gas supplied from the inflator,
wherein the second retainer comprises a mesh formed from a wire-shaped shape memory alloy.

2. The apparatus of claim 1, wherein the first retainer is formed in a plate shape including a protrusion along an outer edge thereof.

3. The apparatus of claim 1, further comprising fixing members fixing edges of a second side of the second retainer and crossing each other.

4. The apparatus of claim 1, wherein the fixing members are longer than a bottom of the first retainer and shorter than a bottom of the airbag housing.

5. The apparatus of claim 1, further comprising a fixing band disposed along an edge of a second side of the soft retainer.

6. The apparatus of claim 5, wherein the fixing band comprises a shape memory alloy.

7. The apparatus of claim 1, wherein a viscous substance is applied to a side of the second retainer that comes in contact with the gas from the inflator.

* * * * *